(12) United States Patent
Kawanabe et al.

(10) Patent No.: US 7,016,121 B2
(45) Date of Patent: Mar. 21, 2006

(54) DECENTERING ADJUSTMENT METHOD FOR A LENS, AND A LENS DEVICE THEREOF

(75) Inventors: Yuuichi Kawanabe, Saitama (JP); Satoru Horikoshi, Saitama (JP); Kazuhiko Onda, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/988,637

(22) Filed: Nov. 16, 2004

(65) Prior Publication Data

US 2005/0105193 A1    May 19, 2005

(30) Foreign Application Priority Data

Nov. 17, 2003    (JP)    ............................. 2003-386235

(51) Int. Cl.
*G02B 15/14*    (2006.01)
*G02B 7/02*    (2006.01)

(52) U.S. Cl. ........................ 359/694; 359/819; 359/827

(58) Field of Classification Search ................ 359/811, 359/813, 814, 819, 821, 822, 823, 824, 825, 359/826, 827, 694

See application file for complete search history.

(56) References Cited

FOREIGN PATENT DOCUMENTS

JP    2000-275494    10/2000

*Primary Examiner*—Timothy Thompson
(74) *Attorney, Agent, or Firm*—Arnold International; Bruce Y. Arnold

(57) ABSTRACT

A zoom lens device has a first lens holding barrel, a second lens holding barrel, the first lens holding frame and the second lens holding frame, all of which is assembled in a fixed barrel. The second lens holding frame holds a fourth lens group. The second lens holding frame is provided with a hole and a long hole, which fit to a first guide shaft and a second guide shaft respectively. The first and second guide shafts are disposed inside the fixed barrel. A first end of the first guide shaft slidably fits on the second lens holding barrel, while a second end is temporarily fixed to the fixed barrel so as not to move in a direction of an optical axis but to move in a direction substantially perpendicular to the optical axis L. By moving the temporarily fixed second end in the direction substantially perpendicular to the optical axis L, the second lens holding frame can move and a decentering adjustment of the fourth lens group will be made. After the decentering adjustment, the second end is ligidly fixed to the fixed barrel with an adhesive agent.

9 Claims, 7 Drawing Sheets

DECENTERING ADJUSTMENT METHOD FOR A LENS, AND A LENS DEVICE THEREOF

BACKGROUND OF THE INVENTION

1. Field of the Invention

The present invention relates to a decentering adjustment method for a lens which is used in optical instruments such as a photographic camera, an electronic still camera, a video camera, a projector, a photographic printer and the like, and to a lens device capable for decentering adjustment of a lens.

2. Background Arts

As a lens device for an optical instrument, a zoom lens device is extensively employed. The zoom lens device is constructed of plural lens groups, each of which is held by a lens holding frame. It is at the attachment of the lens group to the lens holding frame that each lens is alligned to accurately come into a refference optical axis and to keep a predetermind interval with each other.

Japanese Patent Laid-Open Publication No. 2000-275494 discloses a lens device with a slidable lens holding frame which moves along a guide shaft provided inside a lens barrel. This type of lens device requires precision in assembling so that the lens group may slide accurately and smoothly in a direction of the optical axis.

In reality, no matter how precise the manufacture of each components such as the lens barrel, the lens holding frame and the guide shaft may be, slight gaps among the components will accumulate in assembling to cause a backlash. Thus, the lens group turns to alter its decentering amount (that is, how deviate from the optical axis of a lens system) when it moves for zooming or focusing, and that could trigger such disadvantages as reduced resolving power, out of focus and so on.

Conventionally, the decentering amount is adjusted as follows. The guide shaft is mounted on the lens holding frame and threadably fixed to the lens barrel, then the relative position of the optical axis of the lens (the center of the lens) to that of the lens system is observed. In case of the deviation, a screw on the guide shaft is loosen to modify the lens position and tighten up again.

However, the above method ends up with retightening the screw many times so that the adjustment operation takes long time and lowers the working efficiency.

SUMMARY OF THE INVENTION

In view of the foregoing, a primary object of the present invention is to provide a decentering adjustment method for a lens, and a lens device thereof, that offer an easy adjustment operation.

Another object of the present invention is to provide a decentering adjustment method for a lens, and a lens device thereof, that require no repetition of fixing and releasing a guide shaft to a lens barrel for decentering adjustment of the lens.

To achieve the above objects and other objects, a decentering adjustment method according to the present invention comprises a step of temporarily fixing the guide shaft to the lens barrel, and a step of ligidly fixing the the guide shaft to the lens barrel after decentering adjustment of the lens. In the temporarily fixing step, a first end of the guide shaft, which extends in a direction of an optical axis, is positioned inside the lens barrel, while a second end is set to move in a direction perpendicular to an axis of the guide shaft but not move in a direction of the axis. In the ligidly fixing step, the second end is fixed to the lens barrel with an adhesive agent, a screw, a welding method or the like.

a lens device according to the present invention comprises a lens barrel, a guide shaft disposed in the lens barrel and extending in an optical axis direction, a lens holding frame which slidably fits to the guide shaft and holds a lens, a temporary fixer and a ligidly fixer. The guide shaft includes a first end which is positioned inside the lens barrel, and a second end which is supported by the temporary fixer. The temporary fixer sets the second end to move in a direction perpendicular to an axis of the guide shaft but not to move in a direction of the axis. The ligidly fixer ligidly fixes the second end to the lens barrel after decentering adjustment of the lens.

The temporary fixer comprises a connection member which is integrally fixed to the guide shaft and fits in a hole in the lens barrel with a predetermined clearance, a bias member which is disposed between the hole and the connection member to press the connection member toward the direction of the axis and a coupling member which couples the bias member with the connection member. The guide shaft is positioned in the optical axis direction by the biasing force of the bias member to press the connection member onto the lens barrel, while the connection member is movable in the hole within a predetermined clearance in a direction parpendicular to the optical axis.

The temporary fixer of another embodiment comprises a connection member which is integrally fixed to the guide shaft and fits on a hole in the lens barrel with a predetermined clearance, a leaf spring which contacts with one end of the connection member to press the same, and a coupling member which couples the leaf spring with the connection member. The guide shaft is positioned in the optical axis direction by the biasing force of the leaf spring to press the connection member onto the lens barrel, while the connection member is movable in the hole within a predetermined clearance in a direction perpendicular to the optical axis.

According to the present invention, it is possible to easily operate decentering adjustment of the lens and to reduce the working time for the adjustment.

BRIEF DESCRIPTION OF THE DRAWINGS

The forgoing and other features and advantages of the present invention will become apparent from the following detailed descriptions of the preferred embodiments in conjunction with the accompanying drawings, which are given by way of illustration only and thus do not limit the present invention. In the drawings, the same reference numerals designate like or corresponding parts throughout the several views, and wherein.

DESCRIPTION OF THE PREFFERED EMBODIMENTS

Figure 1:
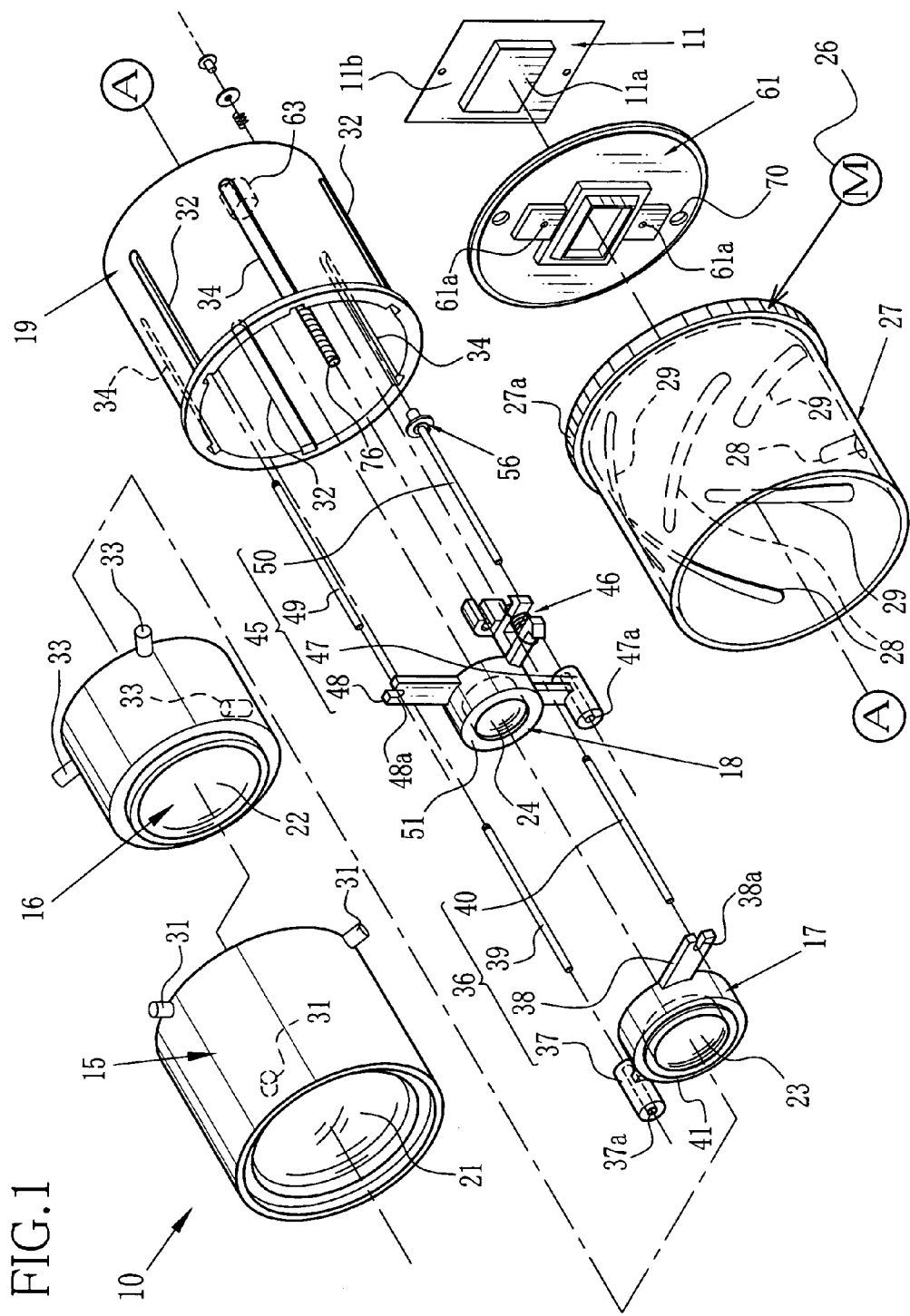
FIG. 1 is an exploded perspective view illustrating a zoom lens device of the present invention.
Figure 2:
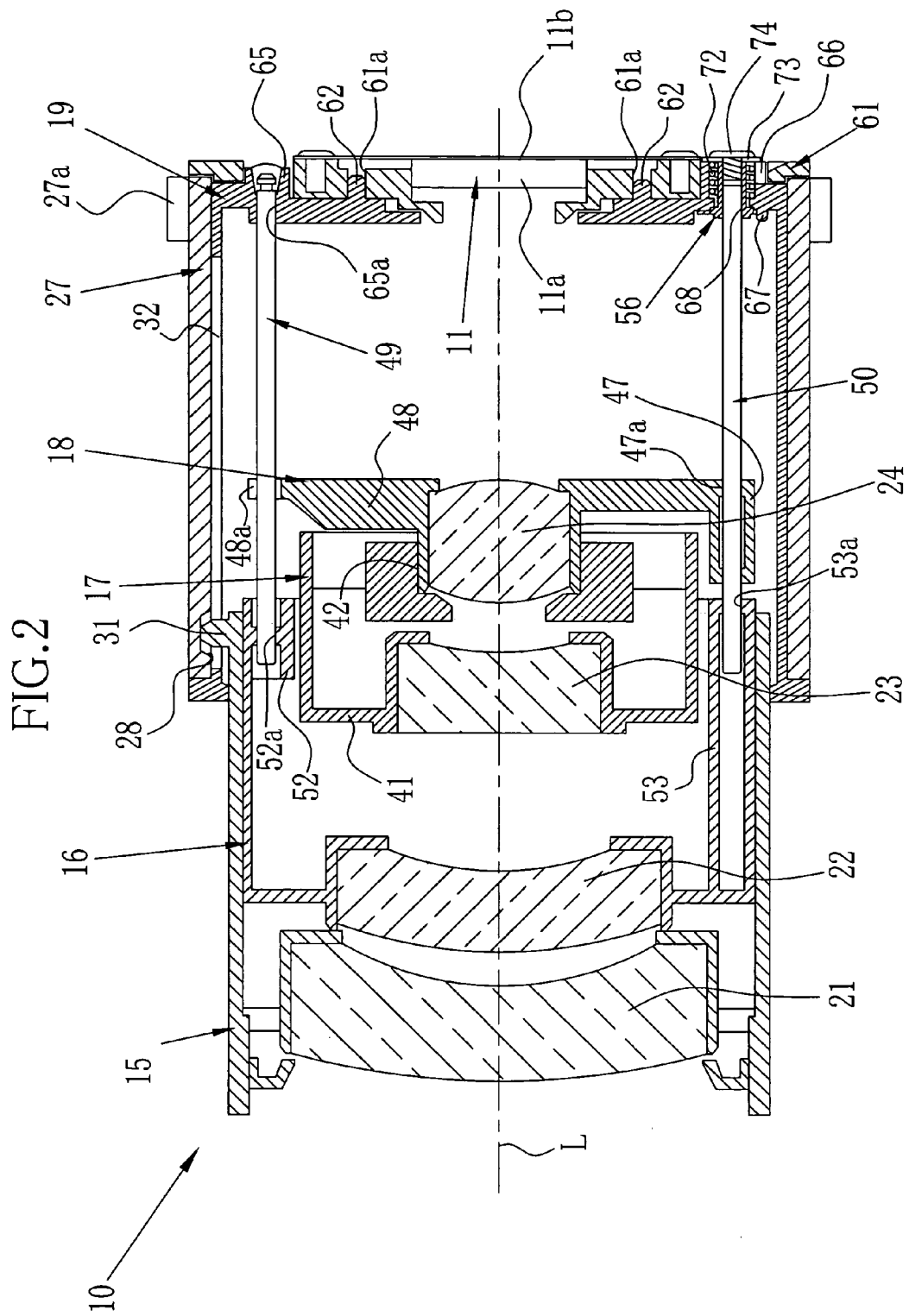
FIG. 2 is a sectional view illustrating a vertical section of the zoom lens device.

In FIGS. 1 and 2, a zoom lens device 10 has an image sensor 11 attached to the rear and is assembled in a digital camera or the like as a imaging unit. For convenience of explanation, one side where the image sensor 11 locates is called an imaging surface side, and the other side is called an object side.

The zoom lens device 10 is assembled such that a first lens holding barrel 15, a second lens holding barrel 16, a first lens holding frame 17 and a second lens holding frame 18 are arranged from the object side to the imaging surface side and these are installed inside of a fixed barrel 19. Zooming operation and focusing operation will be performed by extending and withdrawing the first and second lens holding barrels 15, 16 and the first and second lens holding frames 17, 18 with respect to the fixed barrel 19. Note that the first and second lens holding barrels 15, 16 and the first and second lens holding frames 17, 18 respectively hold first to fourth lens groups 21 to 24, which make up a zoom lens optical system.

The zoom lens device 10 is provided with a zooming motor 26 to be a power source of the zooming operation and a rotary barrel 27 which rotates by the driving force of the zooming motor 26. The rotary barrel 27 is supported on the outer periphery of the fixed barrel 19 and is provided on its outer periphery with a gear 27a, which receives the driving force of the zooming motor 26 to rotate the rotary barrel 27 around the fixed barrel 19. On the inner periphery of the rotary barrel 27, cam grooves 28 and 29 are formed.

The first lens holding barrel 15 firmly holds the first lens group 21 in the front end side. A rear end outer periphery of the first lens holding barrel 15 is provided with guide pin 31. The guide pin 31 penetrates a guide groove 32 formed on the fixed barrel 19 to engage with the cam groove 28 on the rotary barrel 27. As the guide pin 31 slidably fit on the guide groove 32, the rotation of the rotary barrel 27 moves the guide pin 31 back and forth along a lead of the cam groove 28. This gives a linear motion of the first lens holding barrel 15 in a direction of the optical axis L of the zoom lens optical system.

The second lens holding barrel 16 firmly holds the second lens group 22 in its front end side, like wise the first lens holding barrel 15, and is provided with a guide pin 33 on its rear end outer periphery. The guide pin 33 penetrates a guide groove 34 formed on the fixed barrel 19 to engage with the cam groove 29 on the rotary barrel 27. As the guide pin 33 slidably fit on the guide groove 34, the rotation of the rotary barrel 27 moves the guide pin 33 back and forth along a lead of the cam groove 29. This gives a linear motion of the second lens holding barrel 16 in the direction of the optical axis L of the zoom lens optical system.

The first lens holding frame 17 firmly holds the third lens group 23 in the central portion, and is provided with a guide member 36. The guide member 36 is constituted of a fitting boss 37, a fitting projection portion 38 and a pair of guide shafts 39 and 40. The fitting boss 37 and the fitting projection portion 38 are integrated with a rear end of a substantially cylindrical frame 41 which holds the third lens group 23. The fitting projection portion 38 is formed to project from an outer periphery of the frame 41, and includes a cutout 38a which is notched in a direction parpendicular to the optical axis L. The fitting boss 37 lies at a rotationally symmetrical position by 180 degrees to the fitting projection portion 38 around the optical axis L, and includes a hole 37a which extends in the optical axis direction. The hole 37a and the cutout 38a slidably fit on the guide shafts 39 and 40 respectively. The guide shafts 39 and 40 have cylindrical shapes. Their front end is held by the second lens holding barrel 16 and their rear end is held by the fixed barrel 19 so that they are parallel to the optical axis L. Therefore, the first lens holding frame 17 is movable in the optical axis direction. For fixation of the guide shafts 39 and 40, their rear ends are firmly fixed to the fixed barrel 19 by engagement or adhesives, while their front ends slidably fit on a hole (not shown) formed in the second lens holding barrel 16. The first lens holding frame 17 has an opening 42 on its back face to engage with the second lens holding frame 18. Therefore, the first lens holding frame 17 can move together with the second lens holding frame 18.

The second lens holding frame 18 firmly holds the fourth lens group 24 in the central portion, and is provided with a guide member 45 and a coupling member 46. The guide member 45 is constituted of a fitting boss 47, a fitting projection portion 48 and a pair of guide shafts 49 and 50. The fitting boss 47 and the fitting projection portion 48 are integrated with a rear end of a substantially cylindrical frame 51 which holds the fourth lens group 24. The fitting projection portion 48 is formed to project from an outer periphery of the frame 51, and includes a cutout 48a which is notched in a direction perpendicular to the optical axis L. The fitting boss 47 lies at a rotationally symmetrical position by 180 degrees to the fitting projection portion 48 around the optical axis L, and includes a hole 47a which extends in the optical axis direction. The hole 47a and the cutout 48a slidably fit on the guide shafts 49 and 50 respectively. The guide shafts 49 and 50 have cylindrical shapes and are parallel to the optical axis L. Therefore, the second lens holding frame 18 is movable in the optical axis direction.

As shown in details in FIG. 2, the guide shafts 49 and 50 are supported on the front ends by fitting bosses 52 and 53 which are formed integraly with the rear end of the second lens holding barrel 16. The fitting bosses 52 and 53 have holes 52a and 53a whose diameters correspond in size to the guide shafts 49 and 50, and slidably fit on the guide shafts 49 and 50.

For fixation of the guide shaft 49, its rear end is firmly fixed to the fixed barrel 19 by engagement or adhesives, while its front end slidably fits on the hole discribed above.

Figure 3:
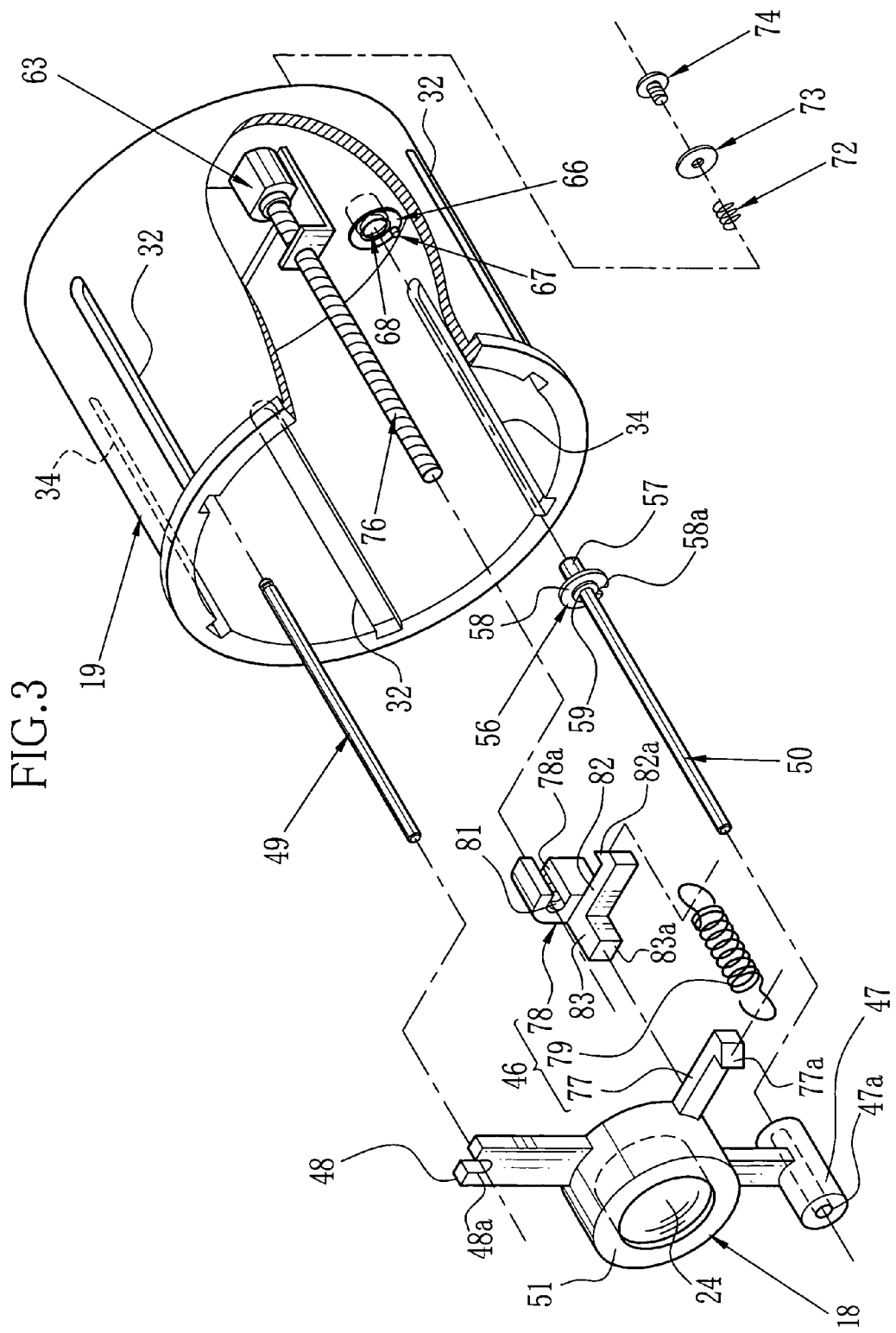
FIG. 3 is an exploded perspective view illustrating a structure around a guide shaft and a connection member which connects with the guide shaft.

The guide shaft 50, as shown in detail in FIG. 3, has a cylindrical shape and is integraly provided with a connection member 56 in the rear end. The connection member 56 comprises a cylindrical member 57 and a flange 58 disposed on the front end of the cyrindrical portion 57, and a through hole 59 is formed in the center. The flange 58 includes a cutout 58a which is notched from the outer periphery to the center. The connection member 56 is firmly fixed to the guide shaft 50 by pressing a rear end portion 50a of the guide shaft 50 into the through hole 59.

The fixed barrel 19 is substantially cylindrical and has the image sensor 11 attached by using a support plate 61. The image sensor 11 comprises a sensor chip 11a, a circuit board 11b and so on, the circuit board 11b is firmly fixed to the support plate 61. On the support plate 61, plural holes 61a are formed to engage with engage pins 62 in the fixed barrel 19. That is, the image sensor 11 is supported at the rear end of the fixed barrel 19 by engaging the engage pins 62 with the holes 61a in the support plate 61, to which the image sensor 11 is firmly fixed. Inside the fixed barrel 19, a focusing motor 63 is fixed.

In addition, the fixed barrel 19 is provided with an engage boss 65 and a temporary fixing boss 66 on the rear end. The engage boss 65 includes a hole 65a to engage with the guide shaft 49.

Figure 4:
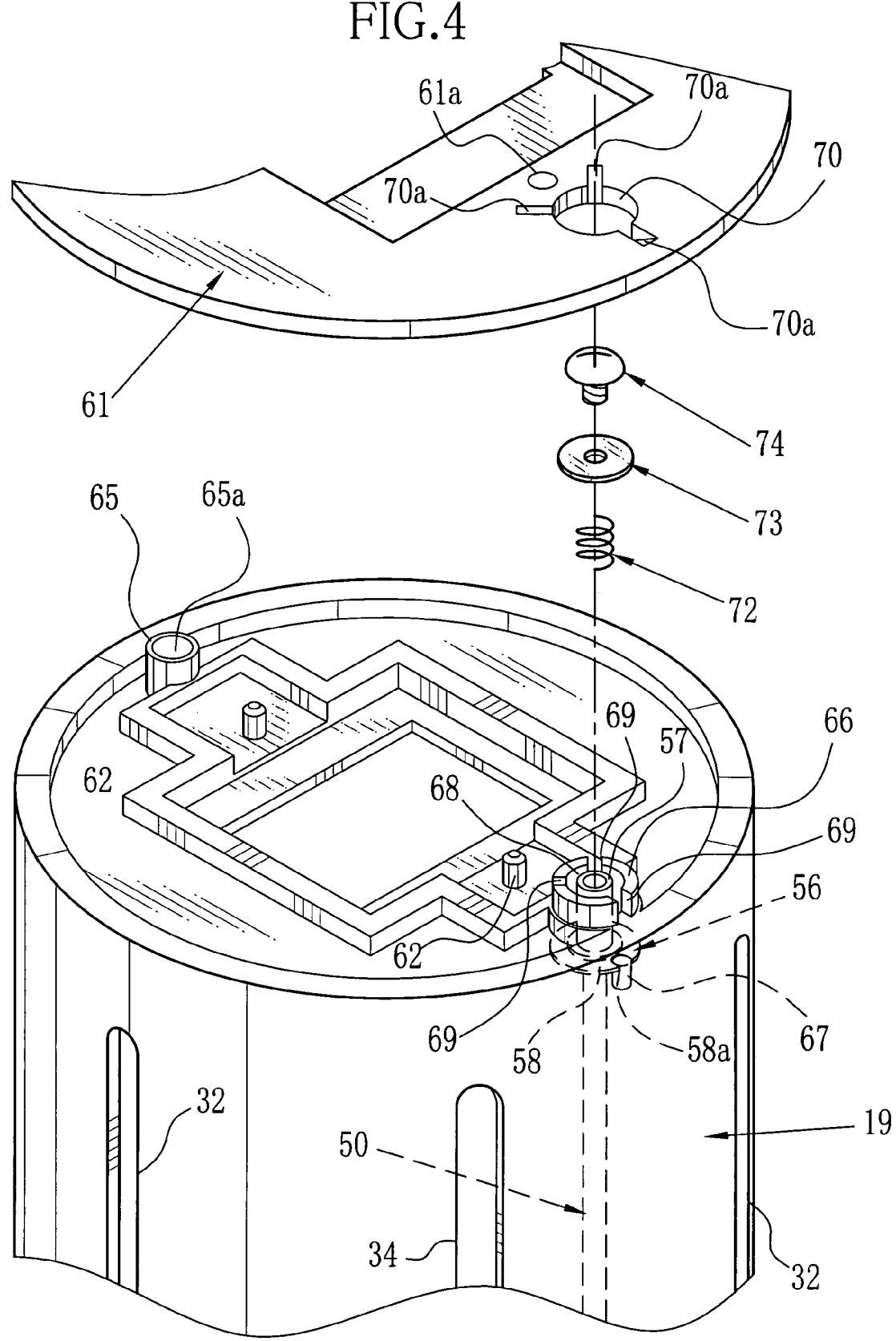
FIG. 4 is a sectional view illustrating a structure around the connection member.
Figure 5:
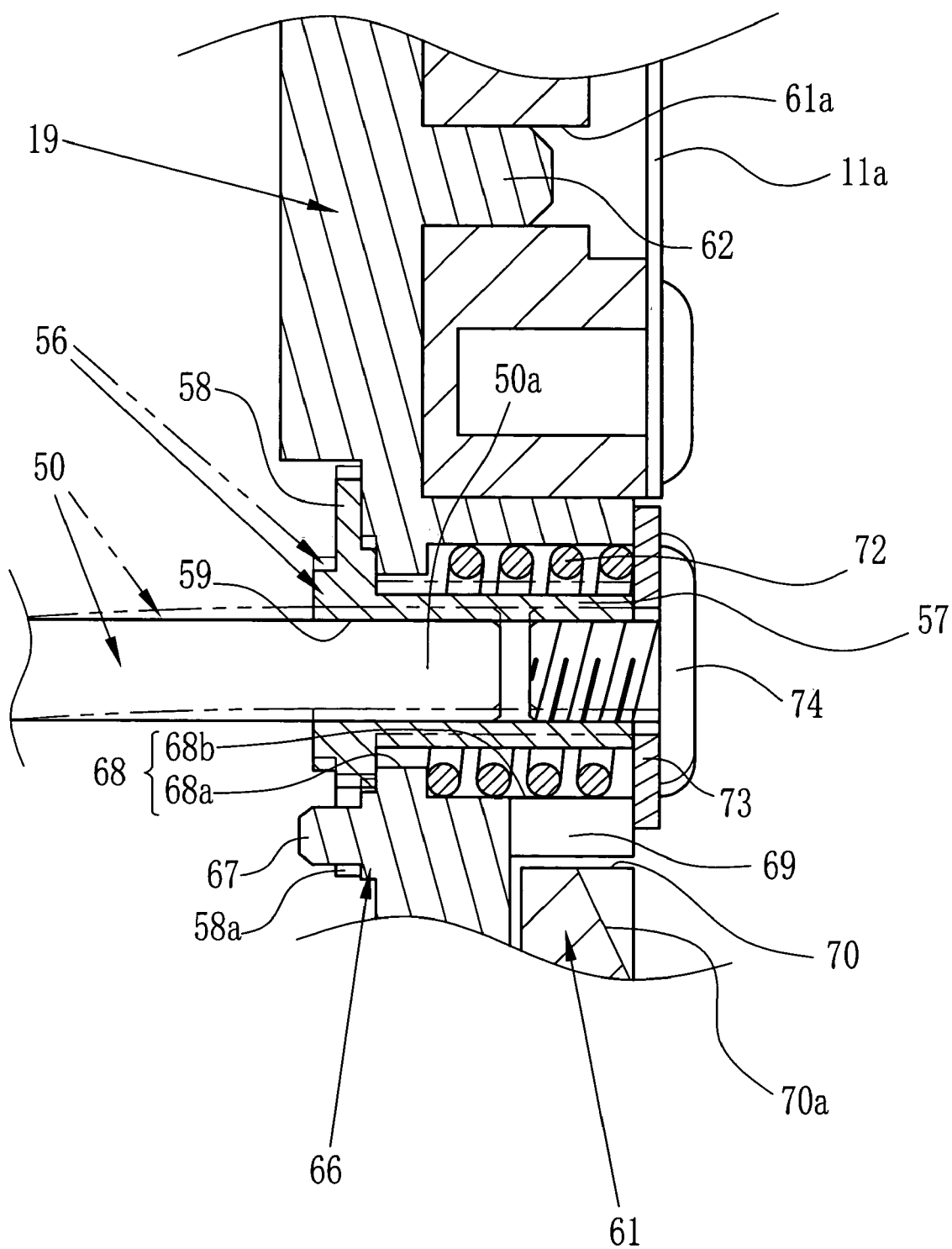
FIG. 5 is an exploded perspective view illustrating a structure around a through hole which fits on the connection member.

As shown in details in FIGS. 3 to 5, the temporary fixing boss 66 is provided with a rotation stop projection 67 on the object side and has a through hole 68 in the center. The through hole 68 comprises a fitting portion 68a on the object side and a receiving portion 68b on the imaging surface side, the receiving portion 68b has a diameter wider than the fitting portion 68a.

The temporary fixing boss 66 has plural slits 69 (see FIGS. 4 and 5) formed from the imaging surface side along the axis direction of the through hole 68. The support plate 61 is provided with an opening 70 to correspond in position to the temporary fixing boss 66, guide grooves 70a are formed around the opening 70 to correspond in position to the slits 69. The guide grooves 70a sinks to the slits 69 from the imaging surface side toward the object side.

The guide shaft 50 is temporarily fixed to the temporary fixing boss 66 through the connection member 56. The connection member 56 is firmly fixed to the fixed barrel 19 after the decentering adjustment of the fourth lens group 24. A fixer for temporarily fixing the connection member 56 to the temporary fixing boss 66 can be a coil srping 72, a washer 73 and a screw 74. The washer 73 has an internal diameter corresponding in size to the screw 74 and an external diameter corresponding in size to the temporary fixing boss 66.

Temporarily fixation of the connection member 56 to the temporary fixing boss 66 starts with inserting the cylindrical member 57 of the connection member 56 into the fitting portion 68a until the flange 58 contacts with temporary fixing boss 66 from the object side. At this time, the cutout 58a of the flange 58 fits on the rotation stop projection 67. As the fitting portion 68a is formed to fit on the cylindrical member 57 with a predetermined clearance, the cylindrical member 57 in the fitting portion 68a can move within a predetermined clearance in the direction perpendicular to the axis direction of the guide shaft 50. The shaft length of the cylindrical member 57 is longer than the length of the fitting portion 68a and penetrates into the receiving portion 68b.

After being fitted in the fitting portion 68a, the cylindrical member 57 penetrates the coil spring 72 to put the coil spring 72 between the cylindrical member 57 and the receiving portion 68b. Then, with the coil spring 72 being compressed, the screw 74 is screwed into the rear end of the cyrindrical part 57 through the washer 73 to threadably mount the connection member 56 on the temporary boss 66. This ensures temporarily fixed state where the connection member 56 is positioned in the axis direction of the guide shafts 50 by the screw 74, but is movable within the predetermined clearance in the direction perpendicular to the axis direction of the guide shaft 50.

The temporarily fixed guide shaft 50 and the fixed guide shaft 49 respectively engage with the hole 47a and the cutout 48a in the second lens holding frame 18 to slidably mount the second lens holding frame 18 thereon.

Further, as shown in FIG. 3, the second lens holding frame 18 couples with a lead screw 76 through the coupling member 46. The lead screw 76 is supported by a holding member (not shown) disposed inside the fixed barrel 19, and couples with a rotary shaft of the focusing motor 63.

The coupling member 46 is constituted of a claw arm 77, a threaded member 78 and a coil spring 79. The claw arm 77 is integrally provided with the frame 51 of the second lens holding frame 18 at an angle of 90 degrees from the fitting boss 47 and the fitting projection portion 48, a claw 77a is formed thereon to project to the object side.

The threaded member 78 has a cutout 78a, a portion of which forms a female screw 81. The female screw 81 is in mesh with the lead screw 76. Further, a claw arm 82 and a contact portion 83 are formed integrally with the threaded member 78. The claw arm 82 is formed to project a claw 82a to the imaging surface side in opposite way to the claw arm 77. A back face of the claw arm 77 contacts with a front end face 83a of the contact portion 83.

One end of the coil spring 79 is hooked on the claw arm 82 in the threaded member 78, while the other end is hooked on the claw arm 77 in the frame 51. The coil spring 79 biases the threaded member 78 to couple with the frame 51. Therefore, the rotation of the lead screw 76 can move the second lens holding frame 18 back and force along the lead of the lead screw 76 for focusing operation. By coupling the second lens holding frame 18 with the lead screw 76 through the coupling member 46 as described above, the second lens holding frame 18 will be positioned in the optical axis direction.

An operation of the above configuration is explained. In assembly process of the lens device 10, the first lens holding frame 17 is slidably supported by the guide member 36, front ends of the guide shafts 39 and 40 of the guide member 36 are fitted on holes (not shown) in the second lens holding barrel 16 so that the first lens holding frame 17 is slidably coupled with the second lens holding barrel 16.

Then, the second lens holding frame 18 is slidably supported by the guide member 45, front ends of the guide shafts 49 and 50 of the guide member 45 are fitted on the holes 52a and 53a in the second lens holding barrel 16 so that the second lens holding frame 18 is slidably coupled with the second lens holding barrel 16. At this time, the guide shaft 50 has already been pressed into and firmly fixed to the connection member 56, and the fixed barrel 19 has been assembled with the rotary barrel 27 and the lead screw 76. The lead screw 76 has also been screwed into the threaded member 78.

Subsequently, with the first and second lens holding frames 17 and 18 slidably supported by the second lens holding barrel 16 as described above, the coil spring 79 is hooked on between the threaded member 78 and the claw arm 77 to connect the lead screw 76 with the second lens holding frame 18. The second lens holding barrel 16 is held by the fixed barrel 19 by fitting the guide pins 33 of the second lens holding barrel 16 on the guide grooves 32 of the fixed barrel 19. To the fixed barrel 19, the guide shafts 39, 40 and 49 are fixed, while the guide shaft 50 is temporarily fixed. The coil spring 72, the washer 73 and the screw 74 are used to temporarily fix the connection member 56 to the fixed barrel 19, which in turn is temporarily assembled with the support plate 61, the image sensor 11, the rotary barrel 27, the first lens holding barrel 15 and so on. In this condition, the decentering adjustments of the first to fourth lens groups 21 to 24 will be made.

The decentering adjustments of the lens groups 21 to 24 start with testing the image resolving power by a circuit fot test, which is plugged into the image sensor 11 and the motors 26 and 63. In the iamge resolving power test, the lens groups focus on a test chart in a certain distance at each zooming position, and the image sensor 11 picks up images on the test chart to display the images in a monitor. The resolving power of the lens device 10 is read out from the images displayed in the monitor. If the resolving power belows a predetermined value, the decentering adjustment will be made by moving the guide shaft 50 in a direction substantially perpendicular to the optical axis direction L. As the guide shaft 50 is temporarily fixed at the rear end portion 50a to have a predetermined clearance in the direction perpendicular to its axis direction, it is possible to move the guide shaft 50 within the predetermined clearance. The movements of guide shaft 50 turns to move the second lens holding frame 18, the fourth lens group 24 changes its relative position to the first to third lens groups 21 to 23. Note that the decentering adjustment will be made by moving the guide shaft 50 little by little on viewing the test chart images in the monitor. On reaching a predetermined resolving power, an adhesive agent is poured into the guide groove 70a in the support plate 61. The adhesive agent passes through the guide groove 70a and the slit 69 to enter the clearance between the connection member 56 and the through hole 68. The adhesive agent solidifys in this state after a certain period of time, and the guide shaft 50 is ligidly fixed to the fixed barrel 19 through the connection member 56. This way, the decentering adjustment of the lens will be easily made without repeating the fixation of the guide shaft 50. A simple adjustment operation will be required for precise assemfly of the lens, and the working time for the adjustment can be reduced.

Figure 6:
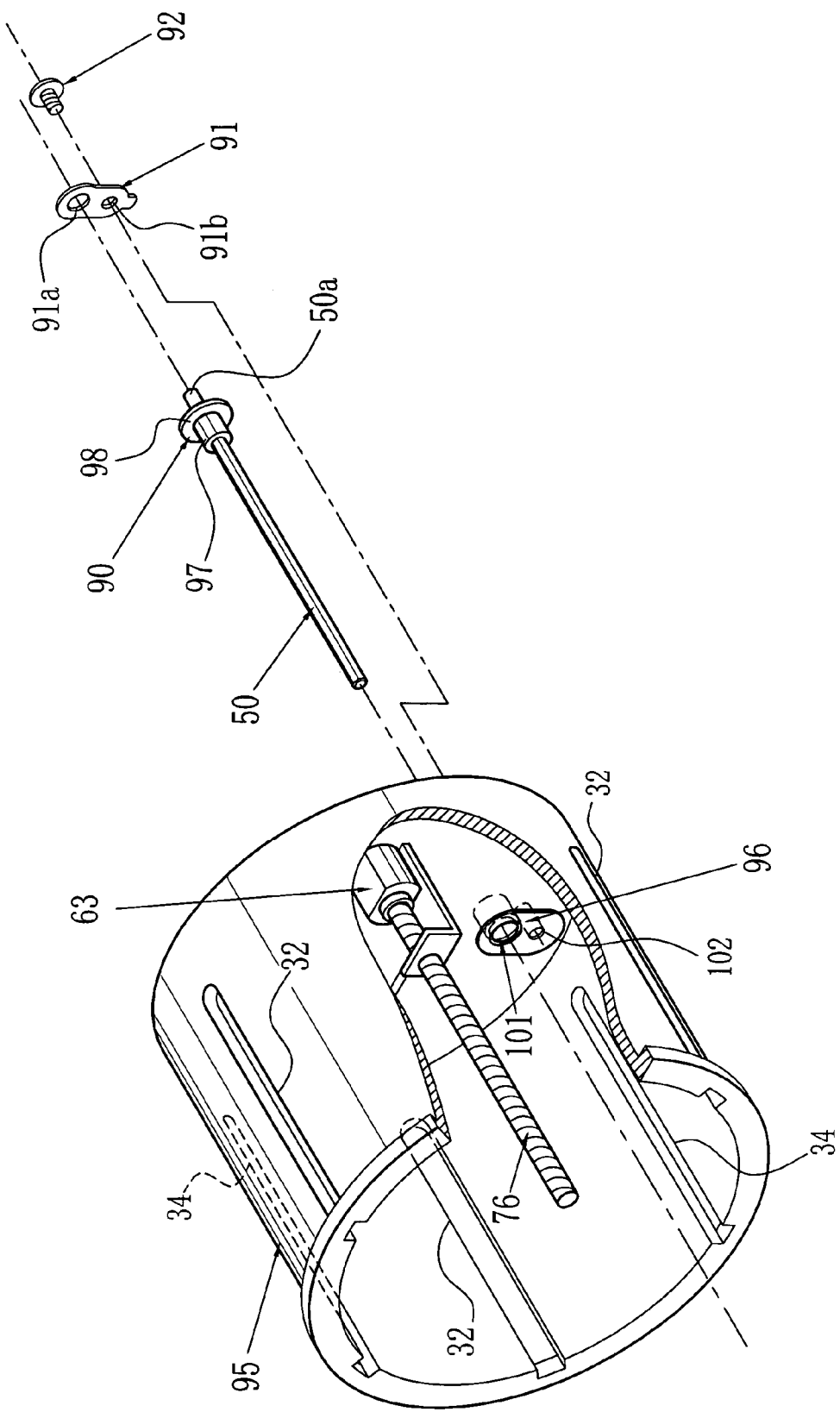
FIG. 6 is an exploded perspective view illustrating a structure of a temporary fixer in the second embodiment of the present invention.
Figure 7:
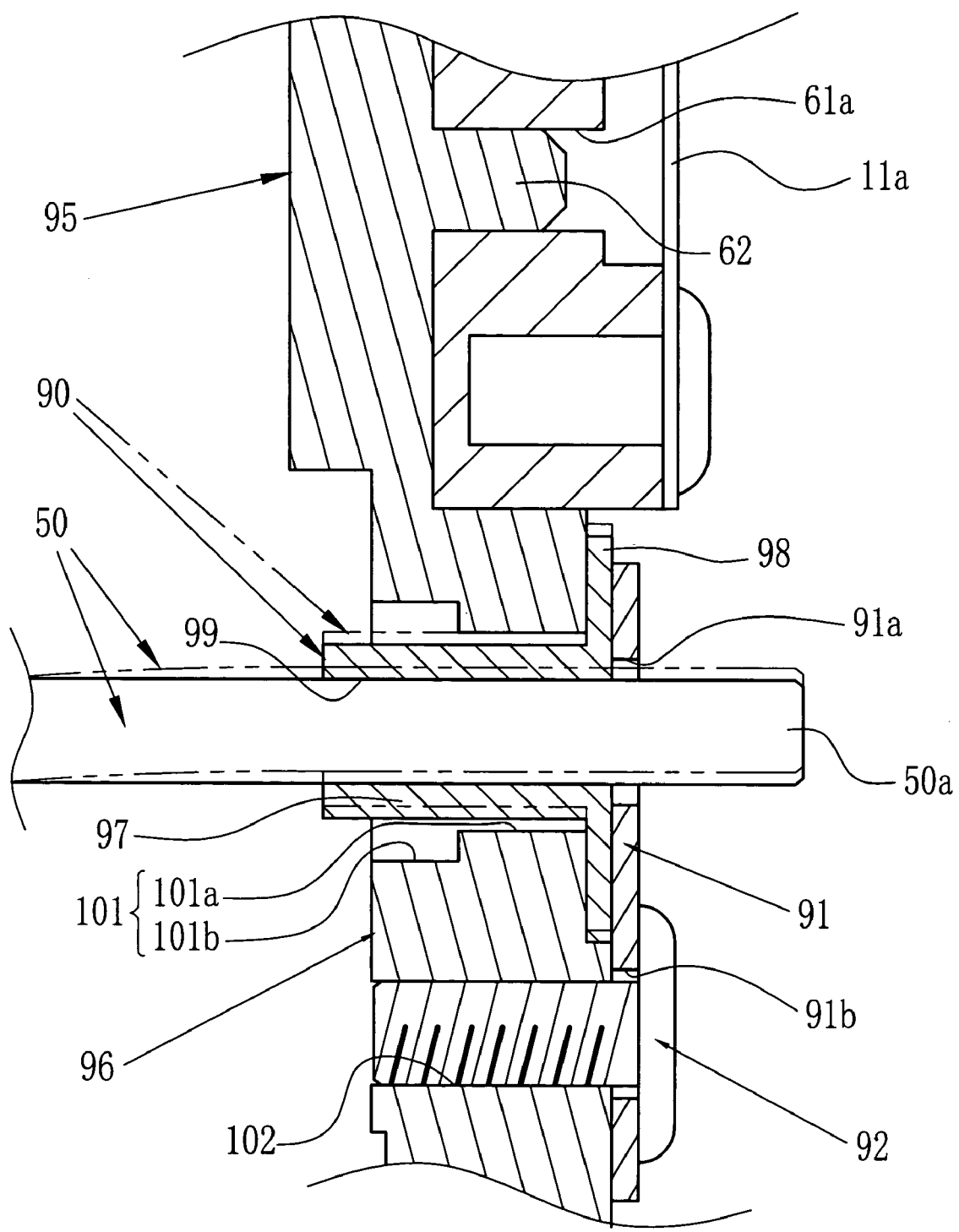
FIG. 7 is an exploded perspective view illustrating a structure around a through hole in the second embodiment of the present invention.

In the above embodiment, such parts as the connection member 56 integraly fixed with the guide shaft 50, the coil spring 72, the washer 73 and the screw 74 are used as the temporary fixer to movably fix the guide shaft 50 to the fixed barrel 19 within a predetermined clearance. However, the present invention is not limited to the embodiment and allows to use, for example, a temporary fixer described in FIGS. 6 and 7. In FIGS. 6 and 7, the common members and parts have the same reference numerals as the first embodiment and their explanations are omitted.

The temporary fixer in FIGS. 6 and 7 is constituted of a connection member 90 integrally fixed to the guide shaft 50, a leaf spring 91 and a screw 92. The temporary fixer temporarily fixes the guide shaft 50 to a fixed barrel 95. Note that the fixed barrel 95 has the same structure as the fixed barrel 19 in the first embodiment except it is provided with a temporary fixing boss 96 instead of the temporary fixing boss 66.

The connection member 90 comprises a cylindrical member 97 and a flange 98 disposed on the front end of the cyrindrical member 97, and has a through hole 99 in the center. The connection member 90 is firmly fixed to the guide shaft 50 by pressing the guide shaft 50 into the through hole 99. The rear end portion 50a of the guide shaft 50 penetrates the connection member 90 to project from the flange 98 toward the imaging surface side.

The temporary fixing boss 96 is provided with a through hole 101 and a screw receiving hole 102 which are arranged in the direction perpendicular to the optical axis L. The leaf spring 91 has a through hole 91a and a screw receiving hole 91b to correspond in position to the through hole 101 and the screw receiving hole 102 in the temporary fixing boss 96.

The fixing hole 101 comprises a fitting portion 101a on the imaging surface side and the non fitting portion 101b on the object side, the non fitting portion 101b has a diameter wider than the fitting portion 101a.

Temporarily fixation of the connection member 90 to the temporary fixing boss 96 starts with inserting the guide shaft 50 into the through hole 101 in the fixed barrel 95 from the imaging surface side toward the object side so that the cylindrical member 97 of the connection member 90 can fit in the fitting portion 101a. Thereafter, with the rear end portion 50a of the guide shaft 50 fitting in the through hole 91a of the leaf spring 91, the leaf spring 91 is fixed to the fixed barrel 95. The fixation of the leaf spring 91 to the fixed barrel 95 is made by setting the screw 92 in the screw receiving hole 91b and threadably mounting the screw 92 on the screw receiving hole 102 of the temporary fixing boss 96. The through hole 91a of the leaf spring 91 has a diameter wider than the through hole 101 of the temporary fixing boss 96. The through hole 101 of the temporary fixing boss 96 is formed to fit on the rear end portion 50a of the guide shaft 50 with a predetermined clearance. This ensures temporarily fixed state where the connection member 90 is fixed in the axis direction of the guide shafts 50 through the leaf spring 91, but is movable within a predetermined clearance in the direction perpendicular to the axis direction of the guide shaft 50.

The temporarily fixed guide shaft 50, along with the guide shaft 49, slidably holds the second lens holding frame 18 in the same manner as the first embodiment. As the connection member 90 is movable in the direction perpendicular to the axis direction within a predetermind clearance, the guide shaft 50 can easily move within the predetermined clearance and the decentering adjustment of the lens will be easily made in the assembly process.

In the above embodiments, the zoom lens device is described as an example. However, the present invention can be applied to a lens device which works only for focusing operation.

As described so far, the present invention is not to be limited to the above embodiments, and all matter contained herein is illustrative and does not limit the scope of the present invention. Thus, obvious modifications may be made within the spirit and scope of the appended claims.

What is claimed is:

1. A decentering adjustment method for a lens being housed in a lens barrel, said lens barrel having a guide shaft extending in a direction of an optical axis, a lens holding frame for holding said lens slidably fitting to said guide shaft, said decentering adjustment method comprising the steps of:

temporarily fixing said guide shaft to said lens barrel in condition that a first end of said guide shaft being positioned in said lens barrel while a second end being movable in a direction perpendicular to an axis direction of said guide shaft but not being movable in said axis direction;

adjusting decentering of said lens by moving said second end in a direction substantially perpendicular to said optical axis direction; and fixing said second end to said lens barrel after adjusting decentering of said lens.

2. A decentering adjustment method as claimed in claim 1, wherein said adjusting decentering step comprising the steps of:

picking up a test chart through said lens with using an image sensor for displaying an image of said test chart;

observing said image of said test chart to test a resolving power of said lens; and moving said second end until said resolving power being good.

3. A decentering adjustment method as claimed in claim 2, wherein said fixing step using an adhessive agent to fix said second end to said lens barrel.

4. A lens device comprising:
a lens barrel;

a guide shaft disposed in said lens barrel and extending in a direction of an optical axis, said guide shaft having a first end being positioned in said lens barrel and a second end being temporarily fixed to said lens barrel before decentering adjustment of a lens;

a lens holding frame slidably fitting to said guide shaft, said lens being attached to said lens holding frame;

a temporary fixer provided on said lens barrel, said temporary fixer holding said second end to move in a direction perpendicular to an axis direction of said guide shaft within a predetermined clearance but not to move in said axis direction; and a fixer for ligidly fixing said second end to said lens barrel after adjusting decentering of said lens.

5. A lens device as claimed in claim 4, wherein said temporary fixer comprising:

a connection member being firmly fixed to said guide shaft and fitting in a hole formed on said lens barrel with a predetermined clearance;

a bias member disposed between said hole and said connection member for biasing said connection member toward said axis direction; and a coupling member for coupling said bias member with said connection member.

6. A lens device as claimed in claim 5, wherein said connection member is movable in said hole within said predetermined clearance in a direction substantially perpendicular to said optical axis, and is pressed to said lens barrel by biasing force of said bias member to keep said guide shaft unmovable in said direction of said optical axis.

7. A lens device as claimed in claim 4, wherein said temporary fixer comprising:

a connection member being firmly fixed to said guide shaft and fitting in a hole formed on said lens barrel with a predetermined clearance;

a leaf spring to connect with one end of said connection member for biasing said connection member; and a coupling member for coupling said leaf spring with said connection member.

8. A lens device as claimed in claim 7, wherein said connection member is movable in said hole within said predetermined clearance in a direction substantially perpendicular to said optical axis, and is pressed to said lens barrel by biasing force of said leaf spring to keep said guide shaft unmovable in said direction of said optical axis.

9. A lens device as claimed in claim 4, wherein said fixer is an adhessive agent.

* * * * *